(12) United States Patent
Shitagami et al.

(10) Patent No.: US 10,969,647 B2
(45) Date of Patent: Apr. 6, 2021

(54) ELECTROPHORETIC PARTICLE, METHOD OF MANUFACTURING ELECTROPHORETIC PARTICLE, ELECTROPHORESIS DISPERSION LIQUID, ELECTROPHORESIS SHEET, ELECTROPHORESIS DEVICE, AND ELECTRONIC APPARATUS

(71) Applicant: E Ink Corporation, Billerica, MA (US)

(72) Inventors: Kozo Shitagami, Chino (JP); Kei Kamakura, Hara-mura (JP); Masahiko Nakazawa, Matsumoto (JP); Hiroki Nakahara, Shiojiri (JP); Harunobu Komatsu, Matsumoto (JP)

(73) Assignee: E Ink Corporation, Billerica, MA (US)

( * ) Notice: Subject to any disclaimer, the term of this patent is extended or adjusted under 35 U.S.C. 154(b) by 1049 days.

(21) Appl. No.: 15/067,135

(22) Filed: Mar. 10, 2016

(65) Prior Publication Data

US 2016/0266462 A1 Sep. 15, 2016

(30) Foreign Application Priority Data

Mar. 11, 2015 (JP) .............................. JP2015-048737

(51) Int. Cl.
*G02F 1/167* (2019.01)
*G02F 1/1675* (2019.01)
*G02F 1/16753* (2019.01)
*G02F 1/16755* (2019.01)

(52) U.S. Cl.
CPC .......... *G02F 1/167* (2013.01); *G02F 1/16753* (2019.01); *G02F 1/16755* (2019.01); *G02F 2001/1678* (2013.01)

(58) Field of Classification Search
None
See application file for complete search history.

(56) References Cited

U.S. PATENT DOCUMENTS

| 8,934,165 | B2 | 1/2015 | Aoki et al. |
| 9,025,237 | B2 | 5/2015 | Yokokawa et al. |
| 2002/0034014 | A1 | 3/2002 | Gretton et al. |
| 2002/0034710 | A1 | 3/2002 | Morris et al. |
| 2002/0185378 | A1 | 12/2002 | Honeyman et al. |
| 2003/0076047 | A1 | 4/2003 | Victor et al. |

(Continued)

FOREIGN PATENT DOCUMENTS

| JP | 2003-526817 A | 9/2003 |
| JP | 2004-505306 A | 2/2004 |

(Continued)

*Primary Examiner* — Darryl J Collins
*Assistant Examiner* — Journey F Sumlar
(74) *Attorney, Agent, or Firm* — Ioannis Constantinides

(57) ABSTRACT

An electrophoretic particle includes a particle and a coating layer, in which the coating layer includes at least one of dispersibility and chargeability, and includes a polymer that connects to the particle, where the polymer includes a first functional group and is connected to the particle via a connected body, the connected body has a molecular weight of 500 or less and includes a second functional group and a third functional group, and the particle, the connected body and the polymer are connected via the chemical bond formed by reacting the first and second functional groups and the chemical bond formed by reacting the hydroxyl group and the third functional group.

14 Claims, 10 Drawing Sheets

(56) References Cited

U.S. PATENT DOCUMENTS

| | | |
|---|---|---|
| 2005/0000813 A1 | 1/2005 | Pullen et al. |
| 2005/0018273 A1 | 1/2005 | Honeyman et al. |
| 2005/0168799 A1 | 8/2005 | Whitesides et al. |
| 2006/0024437 A1 | 2/2006 | Pullen et al. |
| 2007/0128352 A1 | 6/2007 | Honeyman et al. |
| 2007/0146310 A1 | 6/2007 | Paolini, Jr. et al. |
| 2007/0200795 A1 | 8/2007 | Whitesides et al. |
| 2007/0201124 A1 | 8/2007 | Whitesides et al. |
| 2008/0266245 A1 | 10/2008 | Wilcox et al. |
| 2009/0009852 A1 | 1/2009 | Honeyman et al. |
| 2009/0206499 A1 | 8/2009 | Whitesides et al. |
| 2010/0148385 A1 | 6/2010 | Balko et al. |
| 2011/0012825 A1 | 1/2011 | Walls et al. |
| 2013/0265632 A1* | 10/2013 | Aoki .................. G02F 1/167 359/296 |
| 2014/0211296 A1 | 7/2014 | Walls et al. |
| 2014/0355104 A1 | 12/2014 | Nakazawa et al. |
| 2014/0376080 A1 | 12/2014 | Yokokawa et al. |
| 2014/0376081 A1* | 12/2014 | Yokokawa ............. G02F 1/167 359/296 |
| 2015/0205180 A1 | 7/2015 | Yokokawa et al. |
| 2016/0131925 A1* | 5/2016 | Aoki ..................... C08F 299/08 430/32 |

FOREIGN PATENT DOCUMENTS

| | | |
|---|---|---|
| JP | 2006-113374 A | 4/2006 |
| JP | 2013-156380 A | 8/2013 |
| JP | 2013-156381 A | 8/2013 |
| JP | 2013-218036 | 10/2013 |
| JP | 2013-218121 A | 10/2013 |
| JP | 2014-130371 A | 7/2014 |
| JP | 2015-14776 A | 1/2015 |
| JP | 2015-28589 A | 2/2015 |
| JP | 2015-28590 A | 2/2015 |
| JP | 2015-138058 A | 7/2015 |
| JP | 2015-138059 A | 7/2015 |
| JP | 2015-138164 A | 7/2015 |
| WO | WO-2001-67170 | 9/2001 |

* cited by examiner

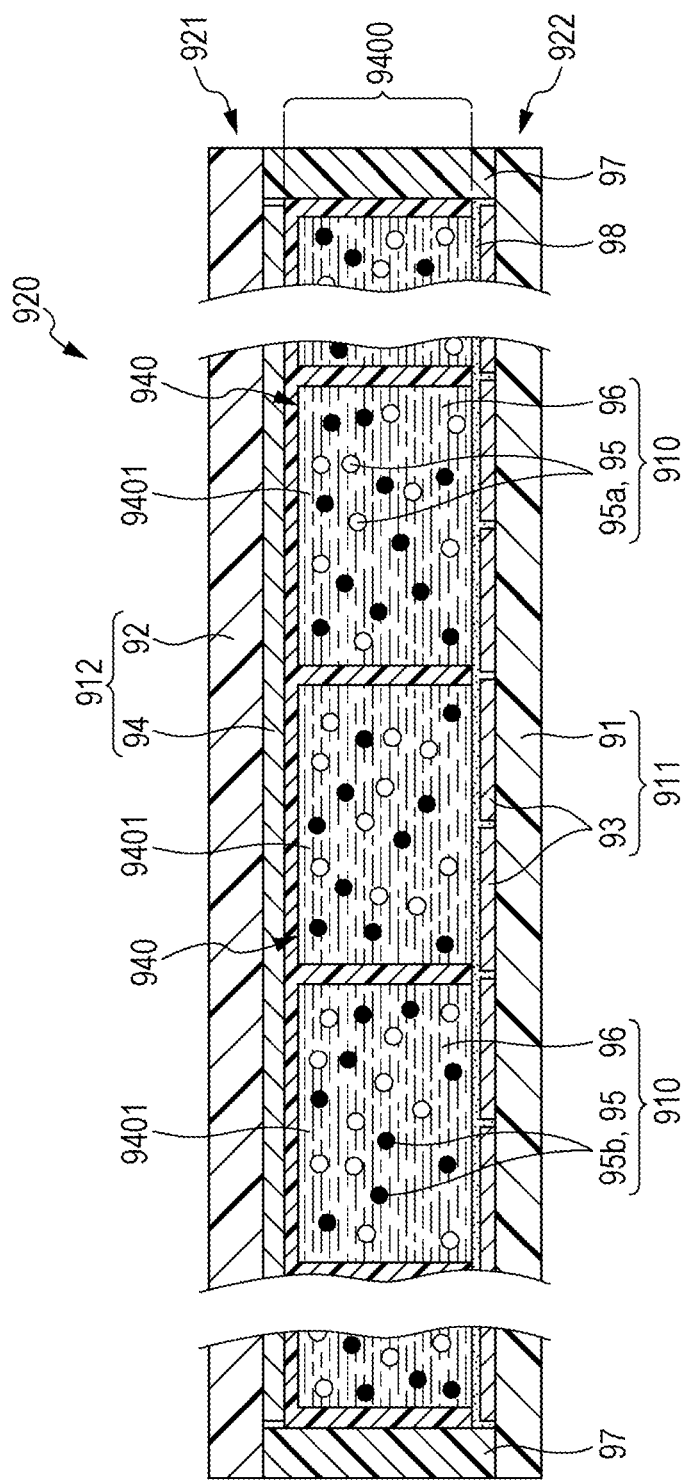

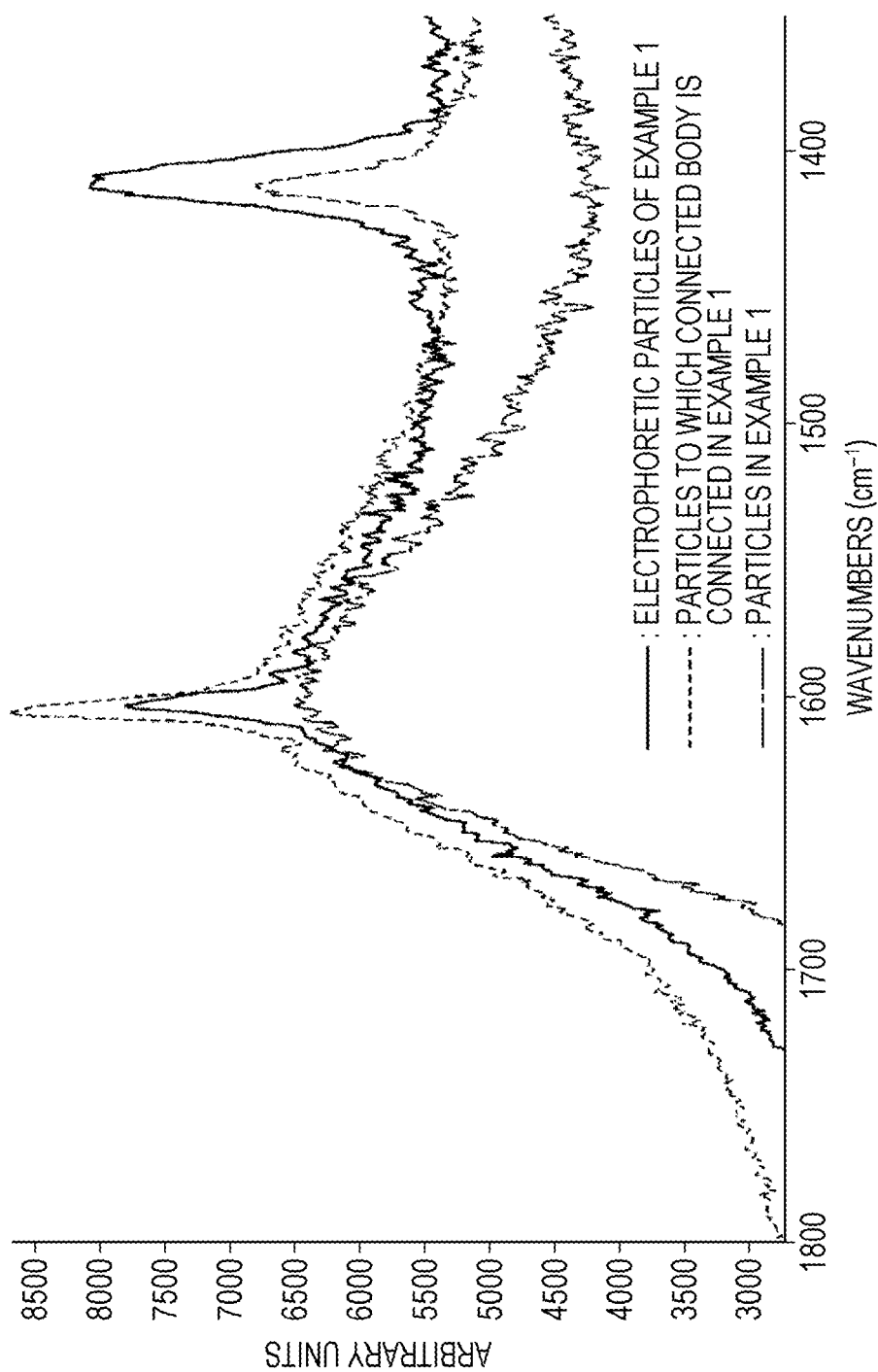

ELECTROPHORETIC PARTICLE, METHOD OF MANUFACTURING ELECTROPHORETIC PARTICLE, ELECTROPHORESIS DISPERSION LIQUID, ELECTROPHORESIS SHEET, ELECTROPHORESIS DEVICE, AND ELECTRONIC APPARATUS

BACKGROUND

1. Technical Field

The present invention relates to an electrophoretic particle, a method of manufacturing an electrophoretic particle, an electrophoresis dispersion liquid, an electrophoresis sheet, an electrophoresis device, and an electronic apparatus.

2. Related Art

Generally, it is known that when a dispersion system in which fine particles are dispersed in a liquid is acted on by an electrical field, the fine particles are moved (migrate) in the liquid due to Coulomb force. This phenomenon is known as electrophoresis, and in recent years, electrophoresis display devices in which desired information (images) is displayed using electrophoresis have garnered attention as new display devices.

The electrophoresis display device has display memory properties in a state in which application of a voltage is stopped and wide viewing angle properties, and is capable of high contrast display with low power consumption.

Since electrophoresis display devices are non-light emitting display devices, electrophoresis display devices are better for the eyes compared to a light-emitting display device such as a cathode ray tube.

Such an electrophoresis display device provided with a dispersion in which the electrophoretic particles are dispersed in a solvent as an electrophoresis dispersion liquid arranged between a pair of substrates having electrodes is known (for example, refer to JP-T-2003-526817).

In the electrophoresis dispersion liquid of this configuration, electrophoretic particles including particles with positive chargeability and particles with negative chargeability are used, and, in so doing, it is possible for desired information (image) to be displayed by applying a voltage between the pair of substrates (electrodes).

Here, particles provided with a coating layer in which a polymer is connected to a base material particle are used as the electrophoretic particles, and the electrophoretic particles can be dispersed and charged in the electrophoresis dispersion liquid by configuring the electrophoretic particles to be provided with such a coating layer (polymer).

The electrophoretic particles with such a configuration use a base material particle having a hydroxyl group and a polymer silane coupling agent, and are structured as follows.

That is, 1. first, the base material particles and the polymer silane coupling agent are prepared, 2. then, by the mixing the base material particles and the polymer silane coupling agent in a solvent and heating the mixed resultant, the polymer silane coupling agent is connected to the base material particles, through dehydration condensation of the hydroxyl group included in the base material particles and the alkoxysilyl group included in the polymer silane coupling agent, thereby manufacturing the electrophoretic particles.

In this case, the polymer silane coupling agent is connected to the base material particles by the dehydration condensation reaction between the hydroxyl group included in the base material particles and the alkoxysilyl group included in the polymer silane coupling agent being initiated due to the hydroxyl group and the alkoxysilyl group coming in contact, and the chemical bond being formed therebetween.

However, the polymer silane coupling agent is a polymer, therefore, the molecular chain is long, and it may be difficult for the hydroxyl group and the alkoxysilyl group to be brought into contact caused by the steric hindrance thereof, and as a result, a problem where the addition amount of the polymer silane coupling agent to the base material particles is not sufficiently reliable. Therefore, a problem arises where the dispersibility of the particles in the particle dispersion liquid after silane coupling may not be reliable, and aggregation occurs between the particles.

In the coating layer that includes the polymer silane coupling agent, because the polymer silane coupling agent is included due to entanglement of the polymer silane coupling agent to each other without forming a chemical bond between the base material particle and the polymer silane coupling agent, the polymer silane coupling agent for which a chemical bond in not formed comes off from the surface of the base material particles in heat resistance tests. Thus, since the polymer silane coupling agent comes off from the base material particles, in a state where it is difficult to ensure the addition amount of the polymeric silane coupling agent to the base material particles is sufficient, a problem arises of aggregation between the particles more significantly.

SUMMARY

An advantage of some aspects of the invention is to provide electrophoretic particles to which at least one characteristic of dispersibility and chargeability is imparted, and include heat resistance that is able to maintain these characteristics over an extended period, a method of manufacturing the electrophoretic particles that is able to manufacture the electrophoretic particles, a high reliability electrophoresis dispersion liquid, electrophoresis sheet, electrophoresis device, and electronic apparatus in which the electrophoretic particles are used.

This advantage is achieved by the invention described below.

According to an aspect of the invention, there is provided an electrophoretic particle including: a particle having a hydroxyl group in the surface thereof; and a coating layer that coats at least a portion of the particle and that includes a polymer, in which the polymer includes a first functional group at a terminal of the polymer, and is connected to the particle via a connected body, the connected body has a molecular weight of 50 or more to 500 or less, and includes a second functional group that reacts with the first functional group, and a third functional group that reacts with the hydroxyl group, and the first and second functional groups are chemically bonded, the hydroxyl group and the third functional group are chemically bonded, and the particle, the connected body and the polymer are connected.

In so doing, it is possible to provide electrophoretic particles to which at least one characteristic of dispersibility and chargeability is imparted as an advantage, and which include heat resistance that is able to maintain these characteristics over an extended period.

In the electrophoretic particle, it is preferable that the third functional group is an alkoxysilyl group.

In so doing, the third functional group and the hydroxyl group are reacted with superior reactivity, and it is possible to strongly connect the particle and the connected body through the chemical bond formed by the groups being reacted.

In the electrophoretic particle, it is preferable that the first functional group is a hydrosilane group.

Since the hydrosilane group has superior reactivity to the vinyl group, for example, the first and second functional groups are reacted (hydrosilylation reaction) with superior reactivity by selecting the vinyl group as the second functional group, and it is possible to connect the connected body to the polymer through the chemical bond formed by reacting the first functional group and the second functional group.

In the electrophoretic particle, it is preferable that the second functional group is a vinyl group.

Since the vinyl group has superior reactivity to the hydrosilane group, for example, the first and second functional groups are reacted (hydrosilylation reaction) with superior reactivity by selecting the hydrosilane group as the first functional group, and it is possible to connect the connected body to the polymer through the chemical bond formed by reacting the first functional group and the second functional group.

In the electrophoretic particle, it is preferable that the connected body includes a plurality of the third functional group.

In so doing, because it is possible for the connected body to form a chemical bond by the third functional groups reacting with one another between the connected bodies connected to not only the hydroxyl group in the surface of the particle but also the neighboring connected bodies existing in the surface of the particle, and it is possible for the connected body to be more strongly connected to the surface of the particle because a network is formed the plurality of connected bodies.

In the electrophoretic particle, it is preferable that the polymer has a weight average molecular weight of 5,000 or more to 50,000 or less.

In so doing, it is possible to reliably impart at least one characteristic from dispersibility and chargeability to the polymer.

According to another aspect of the invention, there is provided a method of manufacturing the electrophoretic particle, the method including: reacting the hydroxyl group and the third functional group, and connecting the connected body to the particle via the formed chemical bond; and obtaining the electrophoretic particles by forming the coating layer by the first and second functional groups being reacted, and the polymer being connected to the connected body via the formed chemical bond.

In so doing, it is possible to manufacture electrophoretic particles to which at least one characteristic of dispersibility and chargeability is imparted as an advantage, and which include heat resistance that is able to maintain these characteristics over an extended period.

According to still another aspect of the invention, there is provided an electrophoresis dispersion liquid including the electrophoretic particle of the above aspects of the invention.

In so doing, it is possible to prepare an electrophoresis dispersion liquid including the electrophoretic particles that exhibit superior dispersion capacity and movement capacity.

According to still another aspect of the invention, there is provided an electrophoresis sheet, including a substrate; and a plurality of structures which are arranged above the substrate, and that each accommodate the electrophoresis dispersion liquid according to each of the above aspects of the invention.

In so doing, a highly reliable electrophoresis sheet is obtained.

According to still another aspect of the invention, there is provided an electrophoresis device provided with the electrophoresis sheet of the above aspects of the invention.

In so doing, a highly reliable electrophoresis device is obtained.

According to still another aspect of the invention, there is provided an electronic apparatus including the electrophoresis device of the above aspects of the invention.

In so doing, a highly reliable electronic apparatus is obtained.

BRIEF DESCRIPTION OF THE DRAWINGS

The invention will be described with reference to the accompanying drawings, wherein like numbers reference like elements.

FIG. 5 is a view schematically showing a longitudinal section of an embodiment of an electrophoresis display device of the invention.

FIG. 9 is a graph showing the analysis results using a Raman microscope.

DESCRIPTION OF EXEMPLARY EMBODIMENTS

Below, the electrophoretic particles, the method of manufacturing the electrophoretic particles, the electrophoresis dispersion liquid, the electrophoresis sheet, the electrophoresis device, and the electronic apparatus of the invention will be described in detail based on favorable embodiments shown in the attached drawings.

First, the electrophoretic particles of the invention will be described. In the embodiment, a case of particles including particles 2 and a coating layer 3 that covers substantially the entire surface of the particles 2, and the polymer 32 included in the coating layer 3 including both dispersibility and chargeability will be described as an example of the electrophoretic particles of the invention.

Electrophoretic Particles

Figure 1:
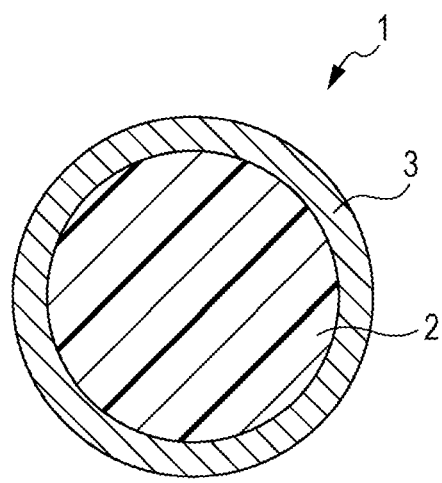
FIG. 1 is a longitudinal sectional view showing an embodiment of an electrophoretic particle of the invention.
Figure 2:
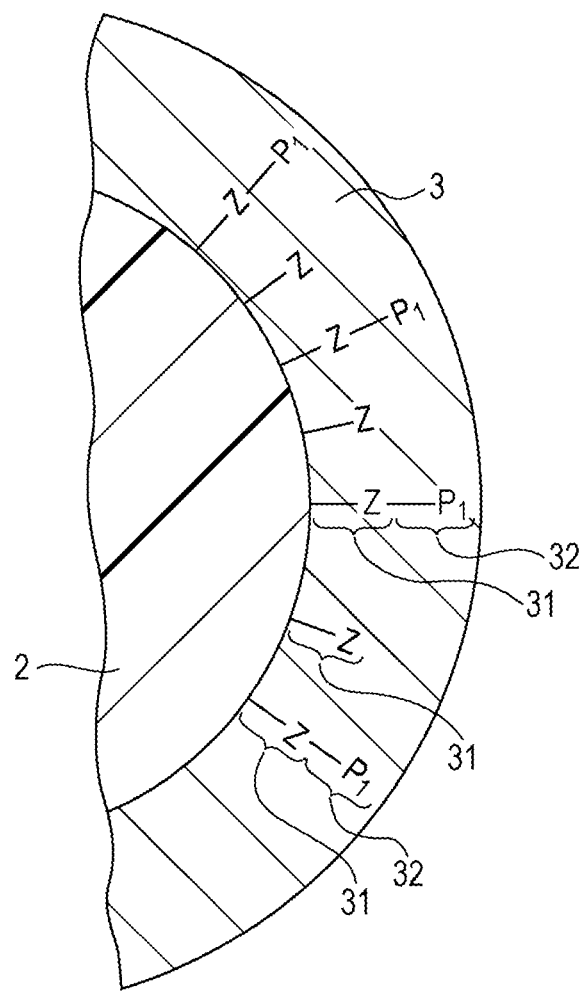
FIG. 2 is a partially enlarged schematic view of the particles included in the electrophoretic particles and a coating layer shown in FIG. 1.

FIG. 1 is a longitudinal sectional view showing an embodiment of an electrophoretic particle of the invention, and FIG. 2 is a partially enlarged schematic view of the particles included in the electrophoretic particles and the coating layer shown in FIG. 1.

The electrophoretic particles 1 include a particle 2 that exposes hydroxyl groups in the surface thereof, and a coating layer 3 provided on substantially the entire surface of the particle 2.

The particles 2 are not particularly limited as long as the hydroxyl group is exposed in the surface thereof, and examples include white pigment particles configured in the main by a metal oxide or a metal hydroxide.

Examples of the metal oxide include titanium dioxide, antimony trioxide, and silicon dioxide, and it is possible to use one type or a combination of two or more types thereof.

Examples of the metal hydroxide include titanium oxyhydroxide, and mica.

The particles 2 may be subjected to a coating treatment or the like by the surface thereof being coated with a resin material. Examples of the resin material include acrylic resins such as polymethyl methacrylate (PMMA), urethane resins, urea resins, epoxy resins, polycarbonate resins (PC), a polyimide resin (PI), and polyesters, such as polystyrene, polyethylene, polyethylene terephthalate, and it is possible to use one type or a combination of two or more types thereof.

The particles 2 may be configured entirely from the resin material, in a case where the resin material has sufficient strength.

The particles 2, as shown in FIG. 1, have a cross-sectional shape formed in a round shape. In this way, because it is possible to make the electrophoretic performance provided to each electrophoretic particles 1 more uniform by forming the particles 2 in a spherical shape, a spherical shape is preferable selected as the shape of the particles 2. As long as a more uniform electrophoretic performance provided to each electrophoretic particle 1 is obtained, the cross-sectional shape of particles 2 may be formed in an oval shape, or a polygonal shape a quadrilateral shape, a pentagonal shape, a hexagonal shape or the like, or may be an aggregation in which particle bodies having these shapes are aggregated.

The particles 2 are not limited to the entire body thereof being a solid body, as described above, and may have a configuration (hollow body) or the like having a base particle and a shell body that encapsulates a base particle in a cell shape (capsule shape) and provided with a space between the base particle and the shell body. It is possible to obtain the particles 2 with this configuration by forming admicellar polymerization (AMP) particles that encompass a base particle configured by an organic polymer in the surface of the base particle in a cell shape as disclosed in JP-A-2013-218036.

In a case where the particles 2 have this configuration, because it is not necessary that the base particles expose the hydroxyl group in the surface thereof, it is possible to use various particles, such as pigment particles, dye particles, resin particles or composite particles thereof as the base particles.

The particles 2 are coated by the coating layer 3 on substantially the entire surface thereof.

The coating layer 3 is configured including a polymer 32 connected to the surface of the particle 2 via the connected body 31.

The polymer 32 provides both dispersibility and chargeability in the embodiment, the characteristics of dispersibility and chargeability are exhibited by the electrophoretic particles 1 in the electrophoresis dispersion liquid, described later, by connecting to the surface of the particle 2 via the connected body 31 connected to the hydroxyl group provided in the particle 2.

The connected body 31 is provided with the second functional group and the third functional group, and the function of causing the polymer 32 to be connected to the surface of the particles 2 via the connected body 31 is exhibited by exhibiting the functions of these functional groups.

Below, the connected body 31 and the polymer 32 included in the coating layer 3 will be described in detail.

The polymer 32 is a compound including the first functional group at the terminal thereof, and further provides a repeating unit (polymer) in which a monomer is polymerized connected to the first functional group.

In the polymer 32, it is possible impart the characteristics of dispersibility and chargeability to the electrophoretic particles 1 in the electrophoresis dispersion liquid, described later, by the repeating unit having both dispersibility and chargeability.

The repeating unit is a polymer formed by polymerizing a plurality of monomers, the type of monomer included in the repeating unit is selected based on the characteristics of dispersibility and chargeability exhibited by the electrophoretic particles 1, and examples of the monomer include, specifically, a non-ionic monomer, a cationic monomer, and an anionic monomer.

The polymer 32 exhibits superior hydrophilicity to the dispersion medium included in the electrophoresis dispersion liquid, described later, by forming the repeating unit (polymer 32) using a polymer including the non-ionic monomer as the monomer. It is possible for the electrophoretic particles 1 that include the polymer 32 to be dispersed in the electrophoresis dispersion liquid without being aggregated. That is, it is possible to impart dispersibility to the electrophoretic particles 1. In the specification, the wording "dispersibility" refers to exhibiting the characteristic of dispersing the electrophoretic particles 1 in the electrophoresis dispersion liquid without aggregating by the repeating unit exhibiting superior hydrophilicity to the dispersion medium.

Examples of the non-ionic monomer include acrylic monomers, such as ethylene, 1-hexene, 1-heptene, 1-octene, methyl(meth)acrylate, ethyl(meth)acrylate, propyl(meth)acrylate, stearyl(meth)acrylate, lauryl(meth)acrylate, decyl(meth)acrylate, isooctyl(meth)acrylate, isobornyl(meth)acrylate, cyclohexyl(meth)acrylate, and pentafluoro(meth)acrylate; styrene monomers, such as styrene, 2-methyl styrene, 3-methyl styrene, 4-methyl styrene, 2-ethyl styrene, 3-ethyl styrene, 4-ethyl styrene, 2-propyl styrene, 3-propyl styrene, 4-propyl styrene, 2-isopropyl styrene, 3-isopropyl styrene, 4-isopropyl styrene, and 4-tert-butyl styrene, and organosiloxane monomers able to form a siloxane structure represented by the following general formula (I).

(I)

[in the formula, each R independently represents a substituted or unsubstituted hydrocarbon group.]

Among these, it is preferable to include the organosiloxane monomers able to form a siloxane structure represented by the above-described general formula (I) as the non-ionic monomer. That is, it is preferable that the polymer 32 includes the first functional group and an organosiloxane connected to the one end of the first functional group. By using such a non-ionic monomer, when using a medium with silicone oil as a main component as the dispersion medium included in the electrophoresis dispersion liquid, described later, it is possible for the electrophoretic particles 1 that include the polymer 32 to dispersed in the dispersion medium having superior dispersibility by polymerizing the non-ionic monomer because the non-ionic monomer exhibits superior hydrophilicity with respect to the dispersion medium.

By forming the repeating unit using a polymer including the cationic monomer as the monomer, the polymer 32 provided with the repeating unit becomes positively (plus) charged in the electrophoresis dispersion liquid, described later. Therefore, in the electrophoresis dispersion liquid, the electrophoretic particles 1 that include the polymer 32 become positively charged electrophoretic particles (positive electrophoretic particles). That is, it is possible to impart positive chargeability to the electrophoretic particles 1.

By forming the repeating unit using a polymer including the anionic monomer as the monomer, the polymer 32 provided with the repeating unit becomes negatively (minus) charged in the electrophoresis dispersion liquid, described later. Therefore, in the electrophoresis dispersion liquid, the electrophoretic particles 1 that include the polymer 32 become negatively charged electrophoretic particles (negative electrophoretic particles). That is, it is possible to impart negative chargeability to the electrophoretic particles 1.

In the specification, the wording "chargeability" refers to the electrophoretic particles 1 exhibiting the characteristics of positive or negative chargeability by the repeating unit being positively or negatively charged in the electrophoresis dispersion medium, as described above.

Examples of such a cationic monomer include those provided with an amino group in the structure thereof, and specifically, include benzyl(meth)acrylate, 2-(diethylamino)ethyl(meth)acrylate, 2-(trimethyl ammonium chloride)ethyl (meth)acrylate, 1,2,2,6,6-pentamethyl-4-piperidyl(meth)acrylate, 2,2,6,6-tetra-methyl-4-piperidyl(meth)acrylate, 1,1,1,3,3,3-hexafluoroisopropyl(meth)acrylate, aminomethyl(meth)acrylate, aminoethyl(meth)acrylate, N,N-dimethylaminoethyl(meth)acrylate, N-ethyl-N-phenyl-aminoethyl (meth)acrylate, N,N-dimethyl(meth)acrylamide, N,N-diethyl(meth)acrylamide, 4-vinyl pyridine, and methacroylcholine chloride.

Examples of the anionic monomer include those including a carboxyl group or a sulfonyl group in the structure thereof, and specifically, include (meth)acrylic acid, carboxymethyl (meth)acrylate, carboxyethyl(meth)acrylate, vinyl benzoic acid, vinyl phenyl acetate, vinyl-phenylpropionic acid, vinyl sulfonic acid, sulfomethyl(meth)acrylate, 2-sulfoethyl (meth)acrylate, polyethylene glycol mono(meth)acrylate, 2-methoxyethyl(meth)acrylate, and diol monomers such as 1,2-ethanediol, 1,2-butanediol, and 1,4-butanediol.

Since the repeating unit is formed by polymerizing various monomers as described above, it is possible to set the extent of the characteristics derived from various monomers in the repeating unit and the polymer 32 by setting the number of constituent units derived from these monomers.

The first functional group has reactivity with the second functional group included in the connected body 31 and is connected to one end of the repeating unit, and in so doing, a chemical bond is formed by reacting with the second functional group included in the connected body 31, and is connected to the chemical bond via the connected body 31.

As long as the first functional group has reactivity to the second functional group included in the connected body, there is no particular limitation, and although examples thereof include a hydrosilane group (—Si—H), a vinyl group, a carboxyl group, and groups represented by the following chemical formula (1), and it is possible to use one type or a combination of two or more types, and, among these, a hydrosilane group is preferable. Since the hydrosilane group has superior reactivity to the vinyl group, the first and second functional groups are reacted (hydrosilylation reaction) with superior reactivity by selecting the vinyl group as the second functional group, that is, by the combination of the first functional group and the second functional group being the combination of the hydrosilane group and the vinyl group, and it is possible to connect the connected body 31 to the polymer 32 through the chemical bond formed by reacting the first functional group and the second functional group.

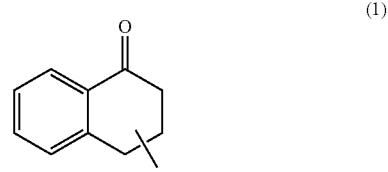

(1)

Taking the above into consideration, preferable example of the polymer 32 include compounds represented by the following general formula (2).

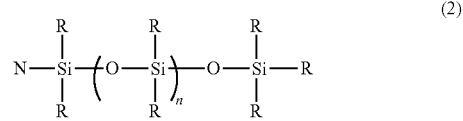

(2)

[in the formula, each R independently represents a substituted or unsubstituted hydrocarbon group, and n represents an integer of 1 or more.]

Although not particularly limited, it is preferable that the weight average molecular weight of the polymer 32 is 5,000 or more to 50,000 or less, and 16,000 or more to 30,000 or less is more preferable. In so doing, it is possible to reliably impart the characteristics of both dispersibility and chargeability to the polymer 32, and it is possible for the first functional group and the second functional group to be reacted without steric hindrance arising in the polymer 32 and to reliable form a chemical bond between the groups in the method of manufacturing the electrophoretic particles, described later.

The connected body 31 includes the second and third functional groups, and functions as a connecting portion for causing the polymer 32 to be connected to the surface of the particle 2 by connecting the polymer 32 after being connected to the hydroxyl group exposed from the surface of the particles 2.

The third functional group has reactivity to the hydroxyl group included in the surface of the particle 2, and causes the particle 2 and the connected body 31 to be connected via the chemical bond formed by reacting the third functional group and the hydroxyl group.

Although the third functional group is not particularly limited as long as it has reactivity to the hydroxyl group, and an alkoxysilyl group such as a methoxy silyl group and an ethoxy silyl group is preferably used. Since the alkoxysilyl group has superior reactivity to the hydroxyl group (OH group), the third functional group and the hydroxyl group are reacted with superior reactivity by selecting the alkoxysilyl group as the third functional group, and it is possible to strongly connect the particle 2 and the connected body 31 through the chemical bond formed by reacting the third functional group and the hydroxyl group.

The second functional group has reactivity to the first functional group included in the polymer 32, and, in so doing, the chemical bond is formed by reacting with the first functional group included in the polymer 32, and is connected to the polymer 32 via the chemical bond.

The second functional group is not particularly limited as long as it has reactivity to the first functional group included in the polymer 32, examples thereof include a hydrosilane group (—Si—H), a vinyl group (carbon-carbon double bond), an acetylene group (carbon-carbon triple bond), and an amino group, and it is possible to use one type or a combination of two or more types thereof.

The second functional group having reactivity with the first functional group described above is selected; however, although examples of the specific combination of the first functional group and the second functional group include a combination of a hydrosilane group and a vinyl group, a combination of a vinyl group and a hydrosilane group, a combination of a vinyl group and a vinyl group, a combination of a hydrosilane group and an acetylene group, a combination of a carboxyl group and an amino group, and a combination of a group represented by the chemical formula (1) and a vinyl group, among these, a combination of a hydrosilane group and a vinyl group is preferable. Since the hydrosilane group has superior reactivity to the vinyl group, the first and second functional groups are reacted (hydrosilylation reaction) with superior reactivity by the combination of the first functional group and the second functional group being the combination of the hydrosilane group and the vinyl group, and it is possible to connect the connected body 31 to the polymer 32 through the chemical bond formed by reacting the first functional group and the second functional group.

A combination of the second functional group and the third functional group included in the connected body 31 not having reactivity to one another is selected. In so doing, when the particle 2 and the connected body 31 are connected, the second functional group and the third functional group react, and it is possible to precisely prevent aggregations of the connected body 31 from being formed.

In the invention, the connected body 31 has a molecular weight of 500 or less. Because when the molecular weight is 500 or less, the molecular weight of the connected body 31 is comparatively low, in the method of manufacturing the electrophoretic particles, described later, it is possible for the hydroxyl group exposed in the surface of the particle 2 and the third functional group included in the connected body 31 to be reacted without steric hindrance arising in the connected body 31. Therefore, it is possible for the connected body 31 to be reacted at a high concentration in the surface of particle 2 in a state where the residual rate of the hydroxyl group exposed in the surface of the particle 2 is low.

Although the molecular weight of the connected body 31 may be 500 or less, approximately 300 or less is preferable, and approximately 50 or more to 150 or less is more preferable. In so doing, it is possible for the connected body 31 to be more highly densely connected to the surface of the particle 2.

Although the connected body includes one third functional group, it is preferable a plurality, such as two or three, to be included. In so doing, because it is possible for the connected body 31 to form a chemical bond by the third functional groups reacting with one another between the paired connected bodies 31 connected to not only the hydroxyl group in the surface of the particles 2 but also the hydroxyl group exposed by the surface of the neighboring particles 2, and it is possible for the connected body 31 to be more strongly connected to the surface of the particle 2 because a network is formed between the plurality of connected bodies 31.

In consideration of the above, preferable examples of the connected body 31 include vinyl trimethoxysilane, vinyl methyldimethoxysilane, triethoxyvinylsilane, and diethoxymethylvinylsilane.

When the polymer 32 and the connected body 31 are represented by $P_1$ and Z, respectively, it is possible to represent the coating layer 3 with the partially enlarged schematic view as in FIG. 2.

The electrophoretic particles 1 are manufactured applying the method of manufacturing the electrophoretic particle of the aspects of the invention as described next.

Method of Manufacturing Electrophoretic Particle

Below, the method of manufacturing the electrophoretic particles 1 will be described.

Figure 3A:
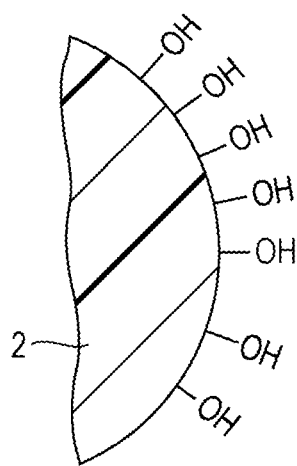
FIGS. 3A to 3C are partially enlarged schematic views for describing a method of manufacturing the electrophoretic particles of the invention.
Figure 3B:
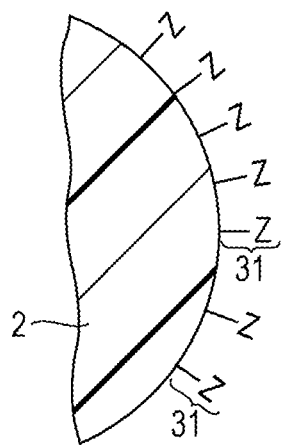
Figure 3C:
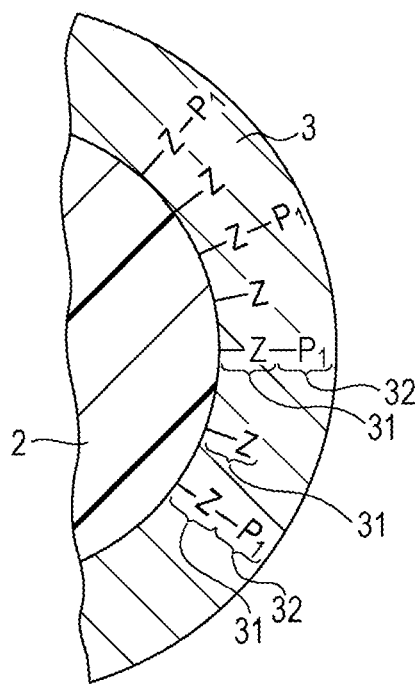

FIGS. 3A to 3C are partially enlarged schematic views for describing the method of manufacturing the electrophoretic particles of the invention.

In the embodiment, the method of manufacturing the electrophoretic particles 1 includes (1) reacting the hydroxyl group exposed in the surface of the particle 2 and the third functional group in a mixture in which a connected body 31 having the second and third functional groups is added to the particles 2 and mixed, and connecting the connected body 31 to the particle 2 via the formed chemical bond (first step), and (2) next, forming the coating layer 3 to obtain the electrophoretic particle 1 by adding the polymer 32 to the particle 2 to which the connected body 31 is connected, causing the first functional group and the second functional group to react, and connecting the polymer 32 to the connected body 31 via the formed chemical bond (second step).

Below, each step will be sequentially described.

(1) First, the particles 2 are prepared, and a mixture prepared in which the connected body 31 is added to the particles 2 and mixed before connecting the connected body 31 is connected to the surface of the particles 2 via the chemical bond formed by reacting the hydroxyl group exposed in the surface of the particles 2 with the third functional group (first step).

(1-1) First, as shown in FIG. 3A, the particles 2 in which the hydroxyl group is exposed in the surface thereof is prepared, and a mixture is obtained by adding the connected body 31 to the particles 2 and mixing.

In so doing, the connected body 31 is adsorbed to the surface of the particle 2.

A solvent is added to the mixture, as necessary. It is preferable that the solvent is a non-polar solvent or a low-polarity solvent. In so doing, it is possible to precisely suppress the influence the solvent exerts on the reaction between the particles 2 and the connected body 31.

Although not particularly limited, examples of such a non-polar solvent or low polarity solvent include hexane, cyclohexane, benzene, toluene, xylene, diethyl ether, chloroform, ethyl acetate, methylene chloride, isooctane, decane, dodecane, tetradecane, and tetrahydrofuran, and it is possible to use one type or a combination of two or more types thereof.

In a case of adsorption of the connected body 31 to the surface of the particles 2, it is preferable to apply ultrasound waves to the mixture. In so doing, the connected body 31 is more reliably adsorbed to the surface of the particle 2.

Although the reaction time in which the ultrasound waves are applied is not particularly limited, a time of 1 hour or more to 5 hours or less, and 2 hours or more to 3 hours or less is more preferable.

In a case where a solvent is added to the mixture, the solvent is removed from the mixture. Removal of the solvent can be performed by centrifuging the mixture and removing the obtained supernatant, then drying the particles 2 to which the connected body 31 is adsorbed.

(1-2) Next, as shown in FIG. 3B, the hydroxyl group exposed in the surface of the particles 2 and the third functional group are reacted, and the connected body 31 is connected to the particles 2 via the chemical bond formed through this reaction.

It is possible to perform the reaction between the hydroxyl group exposed in the surface of the particles 2 and the third functional group included in the connected body 31 by heating the mixture including the particles 2 to which the connected body 31 is adsorbed.

During the reaction between the hydroxyl group and the third functional group, the molecular weight of the connected body 31 is 500 or less, as described above in the invention. Therefore, it is possible for the hydroxyl group exposed in the surface of the particles 2 and the third functional group included in the connected body 31 to be reacted without steric hindrance arising in the connected body 31. Accordingly, it is possible for the connected body 31 to be reacted at a high concentration in the surface of particle 2 in a state where the residual rate of the hydroxyl group exposed in the surface of the particle 2 is low.

In a case where the particles 2 are configured, as described above, by a metal oxide as a main component, although one hydroxyl group exposed in the surface of the particles 2 in an area of approximately 25 $Å^2$ to 81 $Å^2$ in the surface thereof, it is possible for a connected body 31 to be connected corresponding to substantially all of the individual exposed hydroxyl groups per area by giving the connected body 31 this configuration.

The heating temperature of the mixture when the hydroxyl group and the third functional group are reacted is preferable 50° C. or more to 200° C. or less, and 90° C. or more to 130° C. or less is more preferable.

It is preferable that the heating time is 1 hour or more to 5 hours or less, and 2 hours or more to 3 hours or less is more preferable.

It is preferable for the pressure of the atmosphere thereof to be 0.5 Torr or more to 5 Torr or less, and 1 Torr or more to 2 Torr or less is more preferable.

By setting the conditions when the hydroxyl group and the third functional group are reacted within the above ranges, it is possible for the connected body 31 to be more densely connected to the surface of the particle 2.

As described above, by reacting the hydroxyl group and the third functional group, the connected body 31 is more densely connected to substantially the entire surface of the particles 2. That is, the second functional group included in the connected body 31 is introduced to the surface of the particles 2. The polymer 32 is connected to the connected body 31 by the second functional group and the first functional group reacting in the next step (2). Accordingly, the connected body 31 configures a connecting portion that connects (connects) the particle 2 with the polymer 32.

(2) Next, the polymer 32 is connected to the connected body 31 via the chemical bond formed by adding the polymer 32 to the particles 2 to which the connected body 31 is connected and the first functional group and the second functional group being reacted, and, in so doing, electrophoretic particles 1 with a coating layer 3 formed on the surface of the particles 2 are obtained. (second step).

It is possible for the reaction between the first functional group included in the polymer 32 and the second functional group included in the connected body 31 to be performed by adding a catalyst or a condensation agent or the like to the mixture to which the polymer 32 is added to the particles 2 connected to the connected body 31 according to the combination of the first functional group and the second functional group.

Since the reaction between the first functional group and the second functional group, that is, the reaction between the polymer 32 and the connected body 31 connected to the surface of the particles 2 has low steric hindrance and high contact probability between the first functional group and the second functional group, compared to the reaction between a hydroxyl group and an alkoxysilyl group in a case where the first functional group is a hydrosilane group and the second functional group is a vinyl group, superior reactivity is exhibited. Therefore, it is possible for the second functional group included in the connected body 31 connected to the surface of the particle 2 and the first functional group included in the polymer 32 to be reacted with a superior reaction rate.

When the polymer includes an alkoxysilyl group, and when water is interposed between the alkoxysilyl groups, the alkoxysilyl groups are condensed with one another, and the polymers are connected to one another. Also from this viewpoint, when the polymer includes an alkoxysilyl group, the steric hindrance increases. In contrast, when the first functional group included in the polymer 32 is a hydrosilane group, because condensation does not arise between the hydrosilane groups, the steric hindrance of the polymer 32 does not increase.

In light of the above, it is possible to reduce the presence of the polymer 32 present due to entanglement between the polymers 32 without forming the chemical bond between the connected bodies 31, in the coating layer 3 formed on the surface of the particles 2. Therefore, the electrophoretic particles 1 formed exhibit heat resistance that can maintain the characteristics of both dispersibility and chargeability over the long term.

In a case where the combination of the first functional group and the second functional group is a combination of a hydrosilane group and a vinyl group, a combination of a vinyl group and a hydrosilane group, or a combination of a hydrosilane group and an acetylene group, a Pt catalyst such as a platinum chloride, an alcohol-modified platinum chloride, and an olefin complex of platinum chloride is added to the mixture in which the polymer 32 is added to the particles 2 to which the connected body 31 is connected.

In a case where the combination of the first functional group and the second functional group is a combination of a vinyl group and a vinyl group or a combination of a group represented by the chemical formula (1) and a vinyl group, an Ru catalyst, such as a ruthenium salt (for example, $RuCl_3$, $RuBr_3$, $Ru(NO_3)_3$) and a ruthenium complex (for example, $Ru(CO)_5$, $Ru(NO)_5$, $K_4[Ru(CN)_6]$) is added to the mixture.

Furthermore, in a case where the combination of the first functional group and the second functional group is a combination of a carboxyl group and an amino group, a condensation agent such as a dicyclohexylcarbodiimide (DCC), a carbonyldiimidazole (CDI), 4-dimethyl amino pyridine (DMAP) is added to the mixture.

It is preferable that the temperature of the mixture when the first functional group and the second functional group are reacted is 10° C. or more to 50° C. or less, and approximately room temperature (25° C.) is more preferable.

In this way, since the reaction of the first functional group and the second functional group is performed in the presence of the catalyst, it is possible for the reaction of the first functional group and the second functional group to proceed smoothly even if the temperature of the mixture is set to a low temperature such as 10° C. or more to 50° C. or less.

It is preferable that the reaction time is 3 hours or more to 15 hours or less, and 5 hours or more to 10 hours or less is more preferable.

It is preferable that the atmosphere is an inactive gas atmosphere, such as argon or nitrogen gas.

It is preferable for the pressure of the atmosphere thereof to be 500 Torr or more to 5000 Torr or less, and 100 Torr or more to 1000 Torr or less is more preferable.

It is possible for the first functional group and the second functional group to be reacted with superior reaction rate by setting the conditions when the first functional group and the second functional group are reacted as described above.

It is preferable that the weight average molecular weight of the polymer 32, as described above, is 5,000 or more to 50,000 or less, and 16,000 or more to 30,000 or less is more preferable. In so doing, it is possible for the first functional group and the second functional group to be reacted and to more reliably form the chemical bond therebetween, without steric hindrance arising in the polymer 32.

In a case where the particles 2 are configured with a metal oxide as the main component as described above, although one hydroxyl group is exposed in one unit area of approximately 25 $Å^2$ or more to 81 $Å^2$ or less in the surface of the particles 2 and the connected body 31 is connected corresponding to substantially the entirety of the one exposed hydroxyl group per area, when the weight average molecular weight of the polymer 32 is 5,000 or more to 50,000 or less, one polymer 32 is connected via the connected body 31 to an area of approximately 5,000 $Å^2$ or more to 16,000 $Å^2$ or less. Therefore, even after the polymer 32 is connected to the surface of the particle 2 via the connected body 31, a plurality of connected bodies 31 that includes the unreacted second functional group remains on the surface of the particle 2.

In this way, the polymer 32 is connected to the connected body 31 connected to the surface of the particle 2 with a superior reaction rate by reacting the first functional group and the second functional group. That is, the polymer 32 is connected to the surface of the particle 2 via the connected body 31 with a superior reaction rate.

In so doing, electrophoretic particles 1 in which a coating layer 3 is formed on the surface of the particles 2, in other words, electrophoretic particles 1 in which the particles 2, the connected body 31 and the polymer 32 are connected in this order via the chemical bond formed by reacting the first functional group and the second functional group, and the chemical bond formed by reacting the hydroxyl group and the third functional group are manufactured.

It is possible to centrifuge the mixture and remove the obtained supernatant after adding the dispersion medium described with the electrophoresis dispersion liquid, described later, to the mixture after the electrophoretic particles 1 are manufactured to obtain the electrophoresis dispersion liquid, described later, from the electrophoretic particles 1.

Another Configuration Example of Electrophoretic Particles

The electrophoretic particles 1 may be configured as in another configuration example outlined below, in addition to the above-described configuration.

Figure 4:
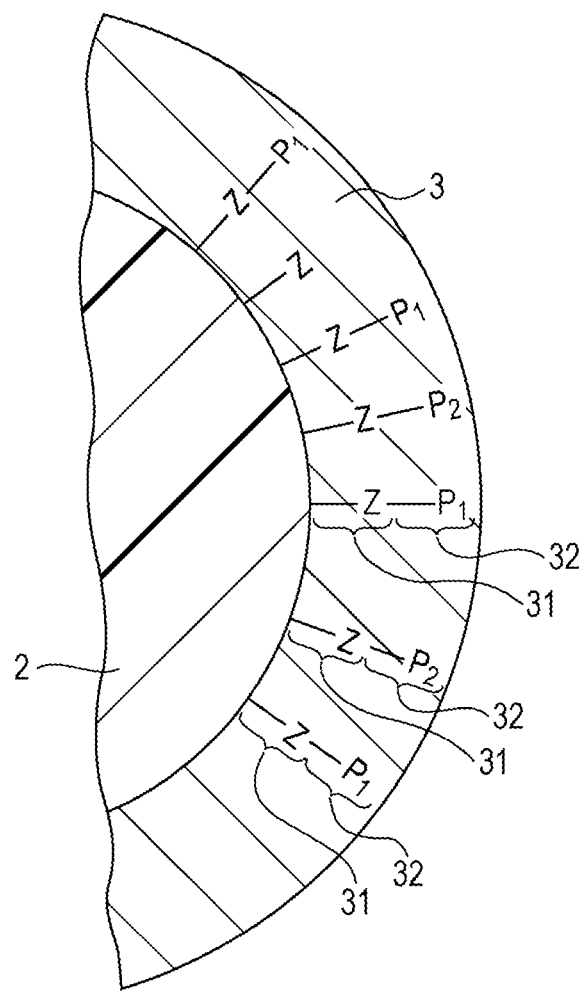
FIG. 4 is a partially enlarged schematic view of another configuration example of the particles included in the electrophoretic particles and the coating layer.

FIG. 4 is a partially enlarged schematic view of another configuration example of the particles included in the electrophoretic particles and the coating layer.

The electrophoretic particles 1 of the other configuration example will be described centering on the points of difference to the above-described electrophoretic particles 1, and similar matters will not be described.

The electrophoretic particles 1 of the other configuration example have the same configuration as the electrophoretic particles 1 with the above-described configuration other than the configuration of the polymer 32 lined to the surface of the particle 2 via the connected body 31 being different.

That is, the electrophoretic particles 1 with the other configuration example have the same configuration as the electrophoretic particles 1 with the above-described configuration other than connecting with $P_2$ with a lower molecular weight than the $P_1$ in addition to the above-described $P_1$ as the polymer 32, as shown in FIG. 4.

It is possible for the polymer 32 (including both $P_1$ and $P_2$) to more densely connected to the surface of the particles 2 via the connected body 31 in the method of manufacturing the electrophoretic particles 1, described later, by using a configuration in which the $P_2$ with a low molecular weight to is further connected to the surface of the particles 2. Therefore, it is possible to more reliably impart the characteristics of both dispersibility and chargeability to the electrophoretic particles 1.

For convenience of description, although $P_2$ is a polymer 32 with a lower molecular weight than $P_1$. $P_2$ may be a dimer, trimer or the like rather than a polymer, as long as the molecular weight is lower than that of $P_1$. It is preferable that the weight average molecular weight of the $P_2$ is 2,500 or more to 25,000 or less, and 8,000 or more to 15,000 or less is more preferable. In so doing, it is possible for the above-described effects to be more remarkably exhibited.

As in the embodiment, in a case where the characteristics of both dispersibility and chargeability are imparted to the electrophoretic particles 1, although both of $P_1$ and $P_2$ may have the characteristics of both dispersibility and chargeability, $P_1$ may have dispersibility and $P_2$ chargeability, or $P_1$ may have chargeability and $P_2$ dispersibility, it is particularly preferable that $P_1$ have dispersibility and $P_2$ chargeability. Although the type of monomer included in the repeating unit is ordinarily selected based on the characteristics of dispersibility and chargeability exhibited by the electrophoretic particles 1 as described above, and specific examples of the monomer include non-ionic monomers, cationic monomers and anionic monomers, it is necessary for a comparatively large amount of a non-ionic polymer to be polymerized in order to impart the characteristic of dispersibility to the polymer 32, whereas chargeability may be imparted to the polymer simply by small amounts of the cationic monomer or anionic monomer being polymerized. Therefore, a combination where $P_1$ has dispersibility and $P_2$ has chargeability is favorably selected.

The same actions and effects as the electrophoretic particles 1 with the above-described electrophoretic particles 1 are also obtained by the electrophoretic particles 1 with this configuration.

Method of Manufacturing of Electrophoretic Particles of Another Configuration Example It is possible to manufacture the electrophoretic particles with the other configuration example by adding the step (3) as shown below after the step (2) (second step) of the method of manufacturing the electrophoretic particles 1 with the above-described configuration.

(3) After the step (2), $P_2$ with a lower molecular weight than $P_1$ is connected to the connected body 31 via the chemical bond formed by further adding $P_2$ with a lower molecular weight than $P_1$ as the polymer 32 to the particles 2 to which $P_1$ as the polymer 32 is connected via the connected body 31 and the first functional group included in $P_1$ and the second functional group remaining on the surface of the particles 2 being reacted.

It is possible to perform the reaction between the first functional group included in $P_2$ and the second functional group remaining on the surface of the particles 2 by further adding $P_2$ with a lower molecular weight than $P_1$ to the mixture after the step (2) is completed.

Since the molecular weight of $P_2$ is lower than $P_1$ and the steric hindrance of $P_2$ is lower than $P_1$, the reaction between the first functional group included in $P_2$ and the second functional group remaining on the surface of the particles 2 proceeds reliably even when $P_1$ is connected to the surface of the particles 2 via the connected body 31 by the step (2).

It is possible for the conditions in which the first functional group included in $P_2$ and the second functional group remaining on the surface of the particles 2 to be made the same as the conditions in which the first functional group and the second functional group are reacted in the step (2).

As above, $P_2$ with a lower molecular weight than $P_1$, in addition to $P_1$ as the polymer 32, is further connected to the connected body 31 connected to the surface of the particles 2 by reacting the first functional group included in $P_2$ and the second functional group remaining on the surface of the particles 2.

Electrophoresis Dispersion Liquid

Next, the electrophoresis dispersion liquid of the invention will be described.

The electrophoresis dispersion liquid is a liquid in which at least one type of electrophoretic particles (electrophoretic particles of the invention) are dispersed (suspended) in a dispersion medium (liquid phase dispersion medium: organic solvent).

It is preferable that a dispersion medium having a boiling point of 100° C. or more and comparatively high insulation properties be used. Examples of the dispersion medium include various types of water (for example, distilled water, pure water, and the like), alcohols such as butanol and glycerin, cellosolves such as butyl cellosolve, esters such as butyl acetate, ketones such as dibutyl ketones, aliphatic hydrocarbons such as pentane (liquid paraffin), alicyclic hydrocarbons such as cyclohexane, aromatic hydrocarbons such as xylene, halogenated hydrocarbons such as methylene chloride, aromatic heterocycles such as pyridine, nitriles such as acetonitrile, amides such as N,N-dimethyl formamide, carboxylic acid salt, and silicone oil, or various other types of oil, and these may be used independently or as a mixture.

Among these, a medium having aliphatic hydrocarbons (liquid paraffin, such as Isopar), or silicone oil as a main component is preferable as the dispersion medium. Since the dispersion medium having liquid paraffin or silicone oil as a main component has a high aggregation suppression effect on the electrophoretic particles 1, it is possible suppress deterioration over time of the display performance of the electrophoresis display device 920. Liquid paraffin or silicone oil has excellent weather resistance because of not having unsaturated bonds, and has the further advantage of high safety.

It is preferable for a dispersion medium with a relative dielectric constant of 1.5 or more to 3 or less to be used, and 1.7 or more to 2.8 or less is more preferable. The dispersion medium has superior dispersibility of the electrophoretic particles 1, and also has excellent electrical insulation properties. Therefore, this contributes to realizing an electrophoresis display device 920 with a reduced power consumption and capable of high contrast display. The value of the dielectric constant is a value measured at 50 Hz, and is a value measured for the dispersion medium with a contained moisture amount of 50 ppm or less and a temperature of 25° C.

Various additives such as charge control agents composes of particles, such as an electrolyte, a surfactant (anionic or cationic), a metallic soap, a resin material, a rubber material, a petroleum, a varnish, or a compound, a lubricant, a stabilizer, and various dyes may be added to the dispersion medium as necessary.

Dispersion of the electrophoretic particles in the dispersion medium is possible by performing one or a combination of two or more types from a paint shaker method, a ball mill method, an ultrasound dispersion method or a stirring dispersion method, or the like.

The electrophoretic particles 1 exhibit a superior dispersion capacity and movement capability through the action of the polymer 32 included in the coating layer 3 in the electrophoresis dispersion liquid.

Electrophoresis Display Device

Next, the electrophoresis display device to which the electrophoresis sheet of the invention is applied (electrophoresis device of the invention) will be described.

Figure 6A:
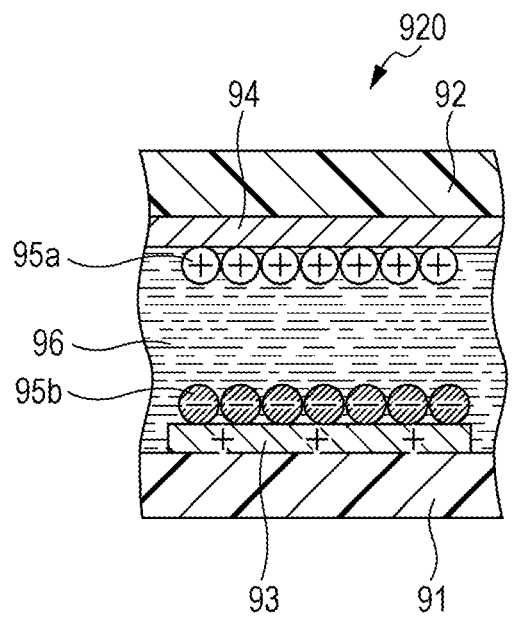
FIGS. 6A and 6B are schematic views showing an operation principle of the electrophoresis display device shown in FIG. 5.
Figure 6B:
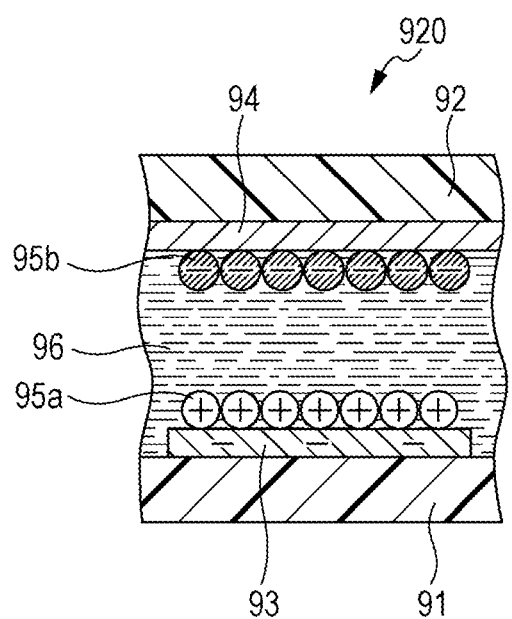

FIG. 5 is a view schematically showing a longitudinal section of an embodiment of an electrophoresis display device of the invention and FIGS. 6A and 6B are schematic views showing an operation principle of the electrophoresis display device shown in FIG. 5. Below, for ease of description, description will be provided with the upper side in FIGS. 5, 6A, and 6B as "up" and the lower side as "down".

The electrophoresis display device 920 shown in FIG. 5 includes an electrophoresis display sheet (front plane) 921, a circuit substrate (back plane) 922, an adhesive layer 98 that bonds the electrophoresis display sheet 921 and the circuit substrate 922, and a sealing portion 97 that hermetically seals the gap between the electrophoresis display sheet 921 and the circuit substrate 922.

The electrophoresis display sheet (electrophoresis sheet of the invention) 921 includes a substrate 912 provided with a plate-like base portion 92 and a second electrode 94 provided on the lower surface of the base portion 92 and a display layer 9400 which is provided on the lower surface (one surface) of the substrate 912 and configured by a dividing wall 940 formed in a matrix, and the electrophoresis dispersion liquid 910.

Meanwhile, the circuit substrate 922 includes a counter substrate 911 provided with a plate-like base portion 91 and a plurality of first electrodes 93 provided on the upper surface of the base portion 91, a circuit (not shown) which is provided on the counter substrate 911 (base portion 91) and includes a switching element such as a TFT, and a driving IC (not shown) by which the switching element is driven.

Below, the configuration of each portion will be sequentially described.

The base portions 91 and 92 are respectively configured by sheet-like (flat plate-like) members, and each member arranged therebetween has a supporting and protecting function.

Although each base portion 91 and 92 may be either flexible or hard, flexible is preferable. By using flexible base portions 91 and 92, it is possible to obtain a flexible electrophoresis display device 920, that is, an electrophoresis display device 920 useful in the construction of electronic paper.

In a case where each base portion (base material layer) 91 and 92 have flexibility, it is preferable that these are each configured by a resin material.

The average thickness of the base portions 91 and 92 are each set, as appropriate, according to the constituent materials, usage or the like, and although not particularly limited, approximately 20 µm to 500 µm is preferable, and approximately 25 µm to 250 µm is more preferable.

A layered (film-like) first electrode 93 and second electrode 94 are respectively provided on the surface of the dividing wall 940 side of the base portions 91 and 92, that is, on the upper surface of the base portion 91 and the lower surface of the base portion 92.

When a voltage is applied between the first electrode 93 and the second electrode 94, an electric field arises therebetween, and the electric field acts on the electrophoretic particles (electrophoretic particles of the invention) 95.

In the embodiment, the second electrode 94 is the common electrode, and the first electrode 93 is an individual electrode (pixel electrode connected to the switching element) divided in a matrix-shape (grid shape), and the parts where the second electrode 94 and one first electrode 93 configure one pixel electrode.

The constituent material of each electrode 93 and 94 is not particularly limited as long as each substantially has conductivity.

The average thickness of the base portions 93 and 94 are each set, as appropriate, according to the constituent materials, usage or the like, and although not particularly limited, approximately 0.05 µm to 10 µm is preferable, and approximately 0.05 µm to 5 µm is more preferable.

From each of the base portions 91 and 92 and each of the electrodes 93 and 94, the base portion and electrode (in the embodiment, the base portion 92 and the second electrode 94) arranged at the display surface side each have optical transparency, that is, are made substantially transparent (colorless and transparent, colored and transparent, or translucent).

In the electrophoresis display sheet 921, the display layer 9400 is provided contacting the lower surface of the second electrode 94.

The display layer 9400 is configured so that the electrophoresis dispersion liquid (the above-described electrophoresis dispersion liquid of the invention) 910 is accommodated (sealed) in the plurality of pixel spaces 9401 defined by the dividing wall 940.

The dividing wall 940 is formed between the counter substrate 911 and the substrate 912 so as to be divided in a matrix.

Examples of the constituent material of the dividing wall 940 include various types of resin materials such as thermoplastic resins, such as acrylic resins, urethane resins, and olefin resins, and heat-curable resins, such as epoxy resins, melamine resins, and phenolic resins, and it is possible to use one type or a combination of two or more kinds thereof.

The electrophoresis dispersion liquid 910 accommodated in the pixel space 9401, in the embodiment, is a liquid in which two types of colored particles 95b and white particles 95a (at least one type of electrophoretic particles 1) are dispersed (suspended) in a dispersion medium 96, and the above-described electrophoresis dispersion liquid of the invention is applied.

In the electrophoresis display device 920, when a voltage is applied between the first electrode 93 and the second electrode 94, the colored particles 95b and the white particles 95a (electrophoretic particles 1) undergo electrophoresis toward either electrode according to the electric field arising therebetween.

In the embodiment, particles having a positive charge are used as the white particles 95a and particles having a negative charge are used as the colored particles (black particles) 95b. That is, the electrophoretic particles 1 in which the polymer 32 is positively charged are used as the white particles 95a, and electrophoretic particles 1 in which the polymer 32 is negatively charged are used as the colored particles 95b.

In a case of using such electrophoretic particles 1, when the first electrode 93 has a positive potential, the white particles 95a move to the second electrode 94 side and gather at the second electrode 94 as shown in FIG. 6A. Meanwhile, the colored particles 95b move to the first electrode 93 side and gather on the first electrode 93. Therefore, when the electrophoresis display device 920 is seen from above (display surface side), the color of the white particles 95a is visible, that is, white is visible.

Conversely, when the first electrode 93 has a negative potential, the white particles 95a move to the first electrode 93 side and gather at the first electrode 93, as shown in FIG. 6B. Meanwhile, the colored particles 95b move to the second electrode 94 side and gather at the second electrode 94. Therefore, when the electrophoresis display device 920 is seen from above (display surface side), the color of the colored particles 95b is visible, that is, black is visible.

In such a configuration, by setting the charging amounts of the white particle 95a and the colored particles 95b (electrophoretic particles 1), the polarity of the electrode 93 or 94, and the potential between the electrodes 93 and 94, as appropriate, desired information (image) is displayed on the display surface side of the electrophoresis display device 920 according to the color combination of the white particles 95a and the colored particles 95b, and the number and the like of particles that gather at the electrodes 93 and 94.

It is preferable for the specific gravity of the electrophoretic particles 1 to be set so at to be substantially the same as the specific gravity of the dispersion medium 96. In so doing, it is possible for the electrophoretic particles 1 to retain a fixed position in the dispersion medium 96 for a long period of time even after the application of the voltage to the electrodes 93 and 94 is stopped. That is, the information displayed on the electrophoresis display device 920 is held for a long period of time.

It is preferable that the average particle diameter of the electrophoretic particles 1 is approximately 0.1 µm to 10 µm, and approximately 0.1 µm to 7.5 µm is more preferable. By having the average particle diameter of the electrophoretic particles 1 in the above range, it is possible to reliably prevent aggregation between the electrophoretic particles 1 or precipitation in the dispersion medium 96, and as a result, it is possible to favorably prevent deterioration of the display quality of the electrophoresis display device 920.

In the embodiment, the electrophoresis display sheet 921 and the circuit substrate 922 are bonded via the adhesive layer 98. In so doing, it is possible for the electrophoresis display sheet 921 and the circuit substrate 922 to be more reliably fixed.

Although the average thickness of the adhesive layer 98 is not particularly limited, approximately 1 μm to 30 μm is preferable, and approximately 5 μm to 20 μm is more preferable.

The sealing portion 97 is provided between the base portions 91 and 92 along the edge portions thereof. Each electrode 93 and 94, the display layer 9400, and the adhesive layer 98 are hermetically sealed by the sealing portion 97. In so doing, it is possible for moisture to be prevented from infiltrating into the electrophoresis display device 920 and to more reliably prevent the deterioration of the display performance of the electrophoresis display device 920.

It is possible for the same materials as the examples of the constituent materials of the above-described dividing wall 940 to be used as the constituent material of the sealing portion 97.

Electronic Apparatus

Next, the electronic apparatus of the invention will be described.

The electronic apparatus of the invention is provided with the electrophoresis display device 920 as described above.

Electronic Paper

First, an embodiment of a case where the electronic apparatus of the invention is applied to electronic paper will be described.

Figure 7:
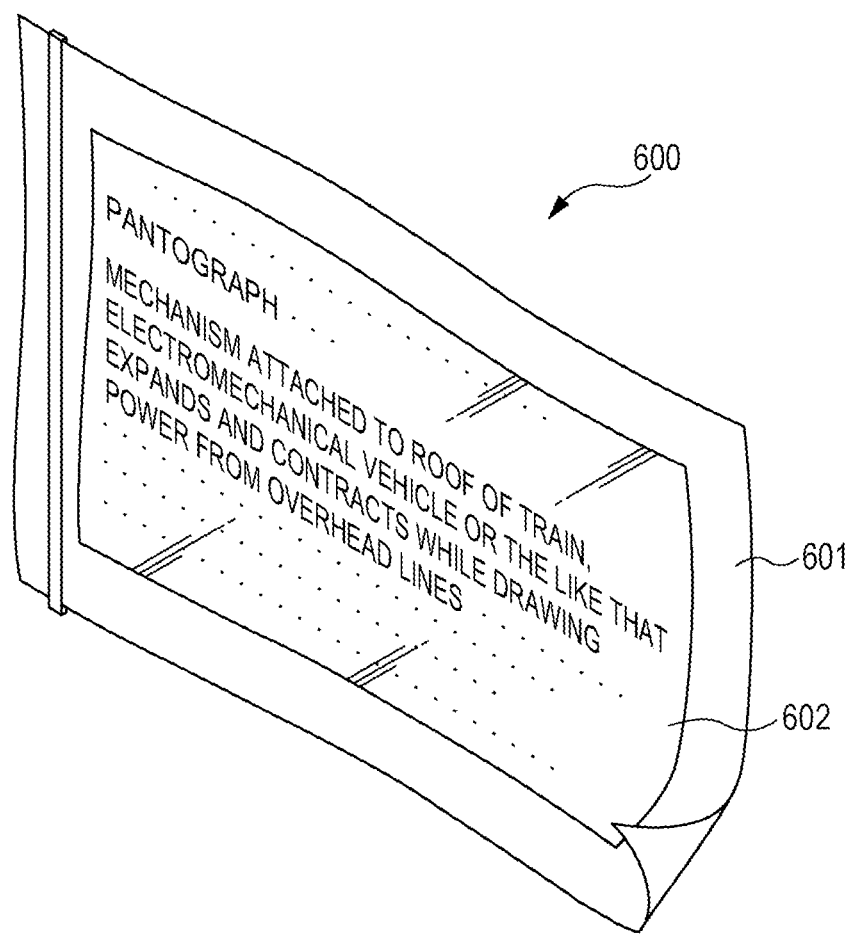
FIG. 7 is a perspective view showing an embodiment of a case where the electronic apparatus of the invention is applied to an electronic paper.

FIG. 7 is a perspective view showing an embodiment of a case where the electronic apparatus of the invention is applied to electronic paper.

The electronic paper 600 shown in FIG. 7 is provided with a main body 601 configured by a rewritable sheet having the same texture and flexibility as paper, and a display unit 602.

In the electronic paper 600, the display unit 602 is configured by the electrophoresis display device 920 as described above.

Display

Next, an embodiment of a case where the electronic apparatus of the invention is applied to a display will be described.

Figure 8A:
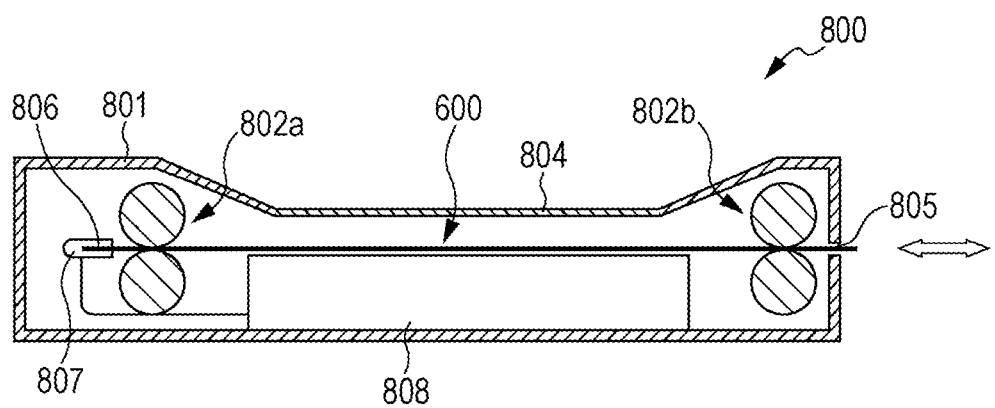
FIGS. 8A and 8B are diagrams showing an embodiment of a case where the electronic apparatus of the invention is applied to a display.
Figure 8B:
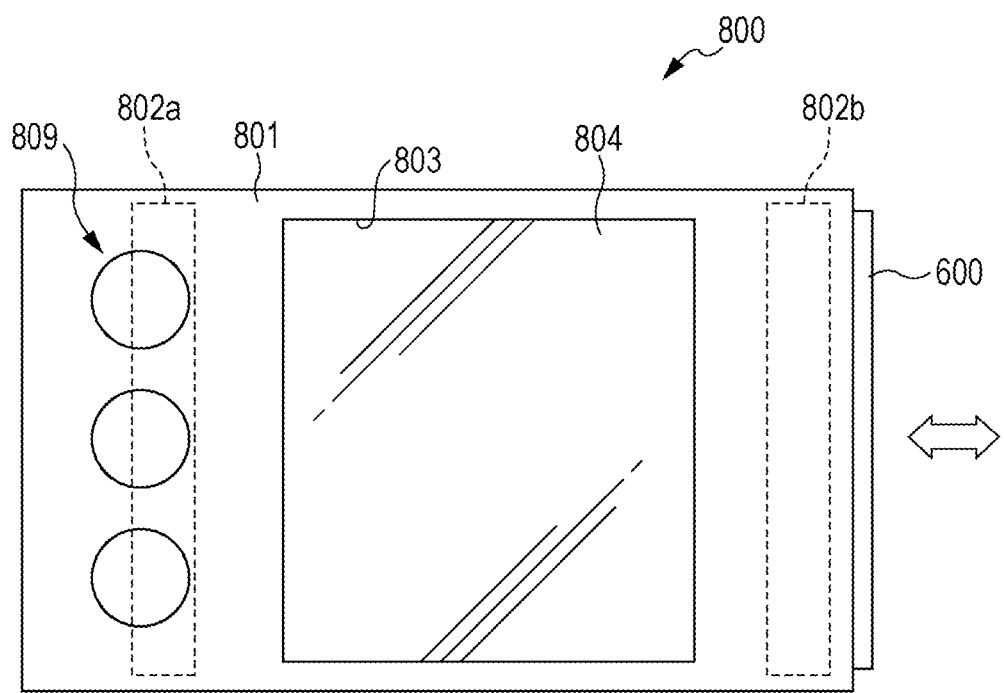

FIGS. 8A and 8B are diagrams showing an embodiment of a case where the electronic apparatus of the invention is applied to a display. Among these, FIG. 8A is a cross-sectional view, and FIG. 8B is a plan view.

The display (display device) 800 shown in FIGS. 8A and 8B is provided with a main body unit 801, and an electronic paper 600 provided so as to be freely detachable with respect to the main body unit 801.

The main body unit 801 has an insertion port 805 allowing insertion of the electronic paper 600 formed in the side portion thereof (right side in FIG. 8A), and is also provided with two sets of transport roller pairs 802a and 802b in the interior thereof. When the electronic paper 600 is inserted inside the main body unit 801 through the insertion port 805, the electronic paper 600 is placed in the main body unit 801 in a state of being pinched by the transport roller pairs 802a and 802b.

A rectangular hole portion 803 is formed in the display surface side of the main body unit 801 (front side of the paper surface in FIG. 8B) and a transparent glass plate 804 is fitted into the hole portion 803. In so doing, it is possible to view the electronic paper 600 in a state of being placed in the main body unit 801 from outside the main body unit 801. That is, the display surface in the display 800 is configured by the electronic paper 600 placed in the main body unit 801 being viewed through the transparent glass plate 804.

A terminal unit 806 is provided on the insertion direction tip portion of the electronic paper 600 (left side in FIG. 8A), and a socket 807 to which the terminal unit 806 is connected in a state in which the electronic paper 600 is placed in the main body unit 801 is provided in the interior of the main body unit 801. A controller 808 and an operation unit 809 are electrically connected to the socket 807.

In the display 800, the electronic paper 600 is placed in the main body unit 801 to be freely detachable, and may be carried and used in a state of being removed from the main body unit 801.

In the display 800, the electronic paper 600 is configured by the electrophoresis display device 920 as described above.

The electronic apparatus of the invention in not limited to application to those described above and examples include televisions, view finder-type or direct-view monitor-type video tape recorders, car navigation systems, pagers, electronic organizers, calculators, electronic newspapers, word processors, personal computers, workstations, video phones, POS terminals, and various electronic apparatuses provided with a touch panel, and the electrophoresis display device 920 can be applied the display unit of these various electronic apparatuses.

Above, although the electrophoretic particles, the method of manufacturing the electrophoretic particles, an electrophoresis dispersion liquid, the electrophoresis sheet, electrophoresis device, and the electronic apparatus of the invention were described based on the embodiments in the drawings, the invention is not limited thereto and the configuration of each part may be changed to an arbitrary configuration having the same function. Other arbitrary configurations may be added to the invention.

One or two or more steps with an arbitrary purpose may be added to the method of manufacturing of the electrophoretic particles of the invention.

In the embodiment, although a case where the coating layer 3 covers substantially the entire surface of the particles 2 is described, there is no limitation to such a configuration, and the coating layer 3 may cover a portion of the surface of the particles.

Although a case where the polymer 32 included in the coating layer 3 includes both dispersibility and chargeability, there is no limitation thereto, and the polymer 32 may include at least one of dispersibility and chargeability.

EXAMPLES

1. Manufacturing of Electrophoretic Particles
(Electrophoresis Dispersion Liquid)

Example 1

(1) First, 20 g of titanium oxide particles ("CR-50" manufactured by Ishihara Sangyo Kaisha, Ltd.) with an average particle diameter of 0.25 μm as the particles were stirred, and thereafter, dispersed in 80 mL of hexane in a reaction vessel to obtain a dispersion liquid (mixture).

The dispersion of the particles in the hexane was performed by applying ultrasound waves to the dispersion liquid for 30 minutes.

(2) Next 0.5 mL (2.5 wt %) of vinyl trimethoxysilane as the connected body was added to the dispersion liquid, and thereafter the connected body was adsorbed on the surface of the particles by applying ultrasound waves to the dispersion liquid.

Applying the ultrasound waves to the dispersion liquid was performed for approximately 2 or 3 hours.

(3) Next, by the dispersion liquid being dried after being centrifuged in conditions of 1000 rpm×10 minutes, and the obtained supernatant removed, the hexane was removed from the dispersion liquid, and particles to which the connected body is adsorbed were obtained.

(4) Next, the hydroxyl group exposed in the surface of the particles and the methoxysilyl group included in the connected body were reacted and the connected body was connected to the particles via the chemical bond thereby formed, by heating the particles to which the connected body was adsorbed for 2 hours in conditions of 110° C. and 1 Torr.

(5) Next, 3 g of the particles to which the connected body is connected and 15 g of the compound represented by the general formula (2) with a weight average molecular weight of 16,000 were weighed, and the mixture was obtained by introducing these into a 200 mL two-necked flask. Thereafter, the mixture was dehydrated by reducing the pressure at room temperature.

Degassing was performed three times for 30 minutes, 15 minutes and 15 minutes at room temperature (unheated) while stirring at a rotation speed of 500 rpm.

(6) Next, 0.2 mL of the platinum catalyst liquid was poured into the mixture with a syringe, and thereafter, the mixture was stirred for 10 hours at a rotation speed of 500 rpm in conditions of room temperature and a nitrogen atmosphere. In so doing, the electrophoretic particles are obtained by subjecting the hydrosilane group and the vinyl group to a hydrosilylation reaction, and bonding the compound represented by the general formula (2) as a polymer to the particles via the connected body.

(7) Next, cleaning of the electrophoretic particles was performed by adding 30 mL of silicone oil (2 cS) to the mixture including the electrophoretic particles, then centrifuging the mixture in conditions of 20000 G×30 minutes, and removing the supernatant obtained after causing the electrophoretic particles to precipitate.

By setting the concentration of the electrophoretic particles, as appropriate, by adding the silicone oil after cleaning a plurality of times, the electrophoresis dispersion liquid in which the electrophoretic particles of Example 1 are dispersed in silicone oil is obtained.

Example 2

Other than using CR-97 (manufactured by Ishihara Sangyo Kaisha, Ltd.) in place of CR-50 as the titanium oxide particles, the electrophoresis dispersion liquid in which the electrophoretic particles of Example 2 are dispersed was obtained similarly to Example 1.

Comparative Example 1

(1) First, the mixture was obtained by weighing each of 3 g of titanium oxide particles ("CR-97" manufactured by Ishihara Sangyo Kaisha, Ltd.) with an average particle diameter of 0.25 μm as the particles and 0.39 g of a silicone-based silane coupling agent with a weight average molecular weight of 16,000 and introducing these to a 200 mL two-necked flask along with KF-96 (manufactured by Shin-Etsu Silicone Co., Ltd., 20 cS) as a solvent.

(2) Next, the hydroxyl group exposed in the surface of the particles and the methoxysilyl group included in the silicone-based coupling agent were reacted by heating and stirring the mixture for 2 hours in conditions of 150° C. and in the atmosphere and the electrophoretic particles in which the silicone-based coupling agent was connected to the particles via the chemical bond thereby formed were obtained.

(3) Next, electrophoretic particles were cleaned by adding 30 mL of silicone oil (2 cS) to the mixture including the electrophoretic particles, then centrifuging the mixture in conditions of 20000 G×30 minutes, and removing the supernatant obtained after causing the electrophoretic particles to precipitate.

The electrophoresis dispersion liquid in which the electrophoretic particles of Comparative Example 1 are dispersed in silicone oil was obtained by setting the concentration of the electrophoretic particles, as appropriate, by adding the silicone oil after cleaning a plurality of times.

2. Evaluation 2-1. Analysis by Raman Spectroscopy

When manufacturing the electrophoretic particles of Example 1, the particles prepared in step (1), the particles to which the obtained connected body is connected in step (4), as well as the electrophoretic particles in Example 1 obtained in step (7) were respectively analyzed using a Raman microscope ("S-2000" manufactured by JEOL Ltd.).

The results are shown in FIG. 9.

As is clear from the spectra of the particles to which the connected body is connected, since peaks derived from the vinyl group are observed at 1410 $cm^{-1}$ and 1610 $cm^{-1}$, it is determined that the connected body, that is, VTMS is connected to the surface of the particles.

From the spectrum of the electrophoretic particles, after connecting to the particles via the connected body of the polymer (compound represented by the general formula (2)), it is clear that the connected body (VTMS) including the unreacted second functional group (vinyl group) remains on the surface of the particles.

2-2. Analysis by FT-IR ATR Spectroscopy

The electrophoretic particles (after cleaning) of Example 1 were analyzed using an FT-IR spectrophotometer ("Cary 630 FT-IR" manufactured by Agilent Technologies, Inc.).

Figure 10:
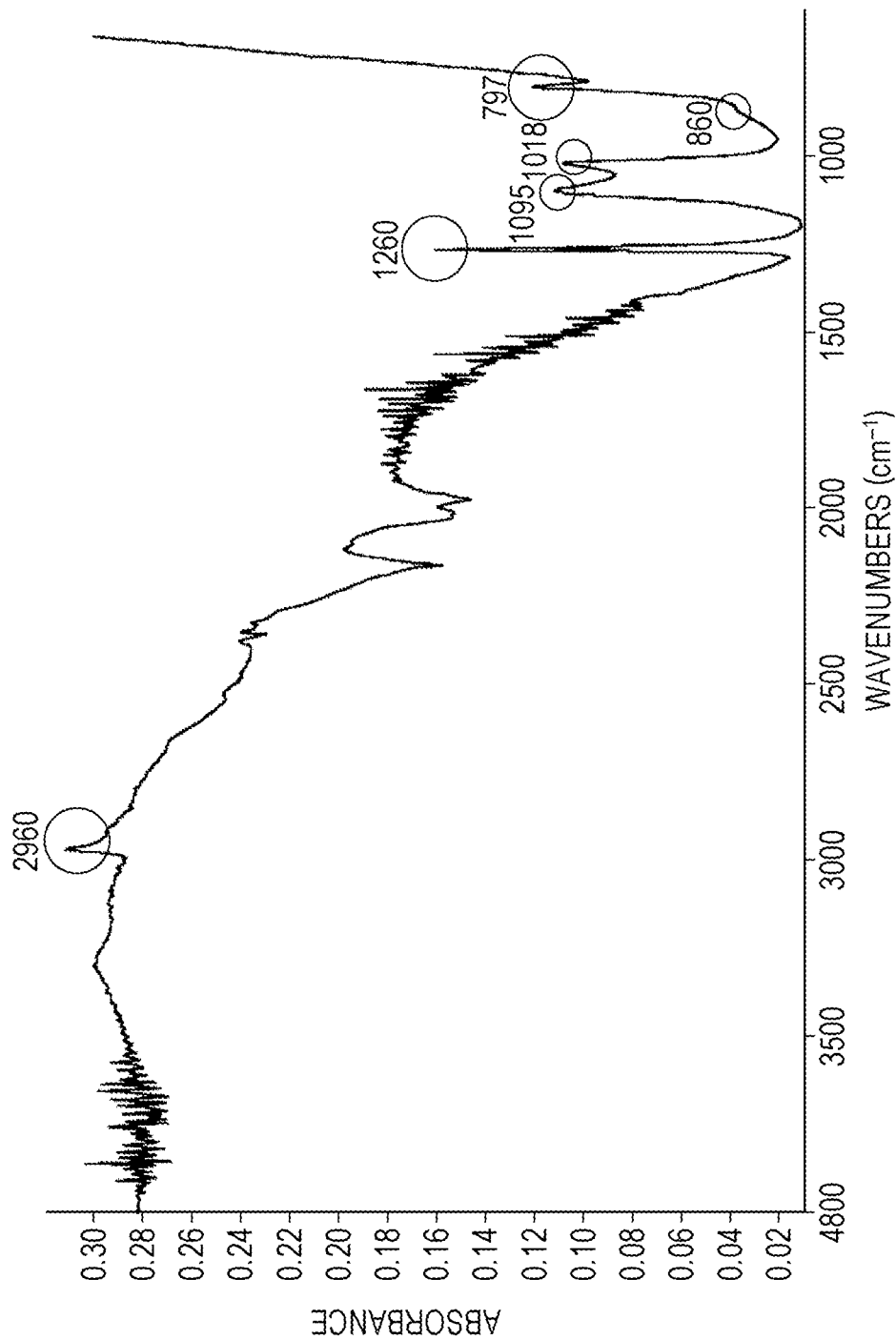
FIG. 10 is a graph showing the analysis results using an FT-IR spectrophotometer.

The results are shown in FIG. 10.

Since peaks derived from the polydimethyl siloxane include in the polymer (compound represented by the general formula (2)) are recognized, as in FIG. 10, it was confirmed that the polymer (compound represented by the general formula (2)) was connected to the surface of the particles via the connected body.

Since the 797 $cm^{-1}$ peak is attributed to the polydimethylsiloxane main chain, the 860 $cm^{-1}$ peak is attributed to the polydimethysiloxane main chain the 1018 $cm^{-1}$ peak is attributed to the Si—O—C stretching vibration, the 1095 $cm^{-1}$ peak is attributed to the Si—O—Si asymmetric stretching vibration, the 1260 $cm^{-1}$ peak is attributed to the Si—$CH_3$ symmetric stretching vibration, and the 2960 $cm^{-1}$ peak is attributed to the CH stretching vibration, in FIG. 10, the positions to which the circles are applied indicate peaks derived from the polymer (compound represented by the general formula (2)).

2-3. Analysis by Thermogravimetric Analysis (TGA)

When manufacturing the electrophoretic particles of Examples 1 and 2, the TGA addition amount (thermal weight reduction amount/wt %) was measured using a thermogravimetric analyzer ("TGA 1" manufactured by Mettler-Toledo International Inc.) for each of the particles to which the obtained connected body is connected in step (4), the electrophoretic particles in Examples 1 and 2 obtained in step (7), and the electrophoretic particles of Comparative Example 1.

The TGA addition amount (thermal weight reduction amount/wt %) of the particles before heating was measured for the particles to which the connected body is connected in Examples 1 and 2 were measured (Examples 1A and 2A). The TGA addition amount (thermal weight reduction amount/wt %) in the electrophoretic particles before heating, the electrophoretic particles after heating in conditions of 90° C. and 120 hours, and the electrophoretic particles after heating in conditions of 90° C. and 240 hours were each measured for the electrophoretic particles of Examples 1 and 2 and Comparative Example 1.

The TGA addition amount of the particles to which the connected body is connected in Examples 1 and 2 was obtained as the weight ratio (wt %) of the connected body (VTMS) to the particles when the total weight (total) of the connected body (VTMS) added in step (2) in Examples 1 and 2 is 100 wt % (Examples 1A and 2A). The TGA addition amount of the electrophoretic particles in Examples 1 and 2 was obtained as the weight ratio (wt %) of the total of the connected body (VTMS) to the particles and the polymer when the total weight (total) of the connected body (VTMS) added in step (2) in Examples 1 and 2, the polymer (compound represented by the general formula (2)) added in step (5), and the particles is 100 wt % (Examples 1 and 2). The TGA addition amount of the electrophoretic particles in Comparative Examples 1 was obtained as the weight ratio (wt %) of the total of the polymer connected to the particles when the total weight (total) of the polymer (silicone-based silane coupling agent) added in step (1) in Comparative Example 1, and the particles is 100 wt % (Comparative Examples 1).

The results are shown in Table. The particles to which the connected body is connected in Examples 1 and 2 are shown in the table as Examples 1A and 2A.

TABLE

|  | 90° C. Heating Time ($\times 10^{-2}$ wt %) | | |
| --- | --- | --- | --- |
|  | 0 Hours | 120 Hours | 240 Hours |
| Example 1A | 21 | — | — |
| Example 1 | 93 | 75 | 78 |
| Example 2A | 4 | — | — |
| Example 2 | 61 | 38 | 40 |
| Comparative Example | 33 | 23 | 22 |

As is clear from Table, in the electrophoretic particles of Example 1, even after 240 hours at 90° C., the addition amount of the total of the connected body connected to the particle and the polymer stabilized at approximately $80 \times 10^{-2}$ wt % in contrast to the addition amount of the polymer to the particles at 0 hours (initial) being $90 \times 10^{-2}$ wt %, and it is possible to determine that a slight lowering of the addition amount was not visible, and possible for particles that are strong against loss of the polymer to be formed. That is, the electrophoretic particles in Example 1 include superior heat resistance.

In the electrophoretic particles in Example 2, even through deteriorated compared to Example 1 after 240 hours at 90° C., the addition amount of the polymer connected to the particles was approximately $40 \times 10^{-2}$ wt % in contrast to $60 \times 10^{-2}$ wt % at 0 hours (initial), and it is possible to form particles that are comparatively weak against loss of the polymer. That is, the electrophoretic particles in Example 2 include a high heat resistance.

In contrast, in the electrophoretic particles in Comparative Example 1, the addition amount of the polymer to the particles at 0 hours (initial) was low, and furthermore, the addition amount of the polymer connected to the particles even after heating was lowered, and the results where the electrophoretic particles of Comparative Example 1 did not include sufficient heat resistance were indicated.

The entire disclosure of Japanese Patent Application No. 2015-048737, filed Mar. 11, 2015 is expressly incorporated by reference herein.

What is claimed is:

1. An electrophoretic particle comprising:
   a particle having a hydroxyl group in the surface thereof; and
   a coating layer that coats at least a portion of the particle and that includes a polymer,
   wherein the polymer includes a first functional group at a terminal of the polymer, and is connected to the particle via a connected body,
   the connected body has a molecular weight of 50 or more to 500 or less, and includes a second functional group that reacts with the first functional group of the polymer, and a third functional group that reacts with the hydroxyl group of the surface of the particle,
   the second functional group is a vinyl group, the third functional group is an alkoxysilyl group, the first and second functional groups are chemically bonded, the hydroxyl group and the third functional group are chemically bonded, and the particle, the connected body and the polymer are connected.

2. The electrophoretic particles according to claim 1, wherein the first functional group is a hydrosilane group.

3. A method of manufacturing the electrophoretic particle according to claim 2, the method comprising:
   reacting the hydroxyl group and the third functional group, and connecting the connected body to the particle via the formed chemical bond; and
   obtaining the electrophoretic particles by forming the coating layer by the first and second functional groups being reacted, and the polymer being connected to the connected body via the formed chemical bond.

4. An electrophoresis dispersion liquid, comprising:
   the electrophoretic particle according to claim 2.

5. The electrophoretic particle according to claim 1, wherein the connected body includes a plurality of the third functional group.

6. A method of manufacturing the electrophoretic particle according to claim 5, the method comprising:
   reacting the hydroxyl group and the third functional group, and connecting the connected body to the particle via the formed chemical bond; and
   obtaining the electrophoretic particles by forming the coating layer by the first and second functional groups being reacted, and the polymer being connected to the connected body via the formed chemical bond.

7. An electrophoresis dispersion liquid, comprising:
   the electrophoretic particle according to claim 5.

8. The electrophoretic particle according to claim 1, wherein the polymer has a weight average molecular weight of 5,000 or more to 50,000 or less.

9. A method of manufacturing the electrophoretic particle according to claim 8, the method comprising:
   reacting the hydroxyl group and the third functional group, and connecting the connected body to the particle via the formed chemical bond; and
   obtaining the electrophoretic particles by forming the coating layer by the first and second functional groups being reacted, and the polymer being connected to the connected body via the formed chemical bond.

10. A method of manufacturing the electrophoretic particle according to claim 1, the method comprising:
reacting the hydroxyl group and the third functional group, and connecting the connected body to the particle via the formed chemical bond; and
obtaining the electrophoretic particles by forming the coating layer by the first and second functional groups being reacted, and the polymer being connected to the connected body via the formed chemical bond.

11. An electrophoresis dispersion liquid, comprising:
the electrophoretic particle according to claim 1.

12. An electrophoresis sheet, comprising:
a substrate; and
a plurality of structures which are arranged above the substrate, and that each accommodate the electrophoresis dispersion liquid according to claim 11.

13. An electrophoresis device comprising:
the electrophoresis sheet according to claim 12.

14. An electronic apparatus comprising:
the electrophoresis device according to claim 13.

* * * * *